May 13, 1924.

H. VINING

BOLL WEEVIL RAKE OR COMB

Filed April 16, 1923   2 Sheets-Sheet 1

1,493,830

Inventor
Homer Vining
by his Attorneys

May 13, 1924.
H. VINING
BOLL WEEVIL RAKE OR COMB
Filed April 16, 1923
1,493,830
2 Sheets-Sheet 2
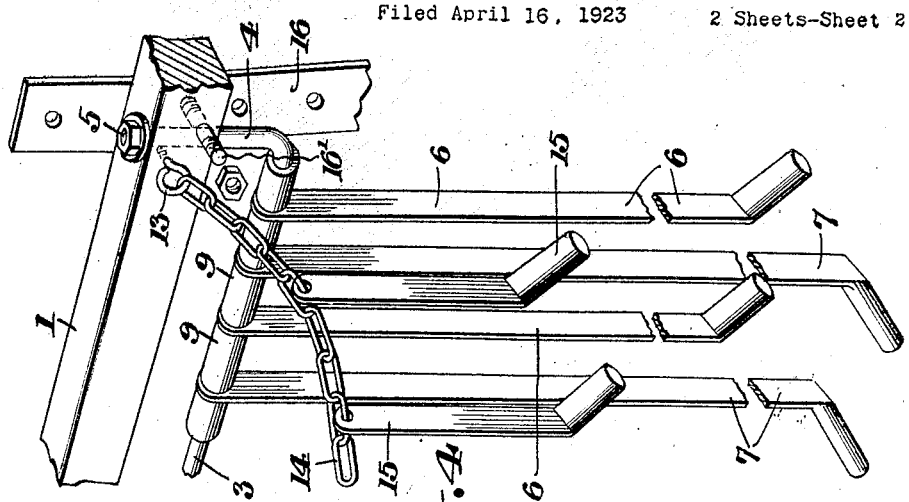
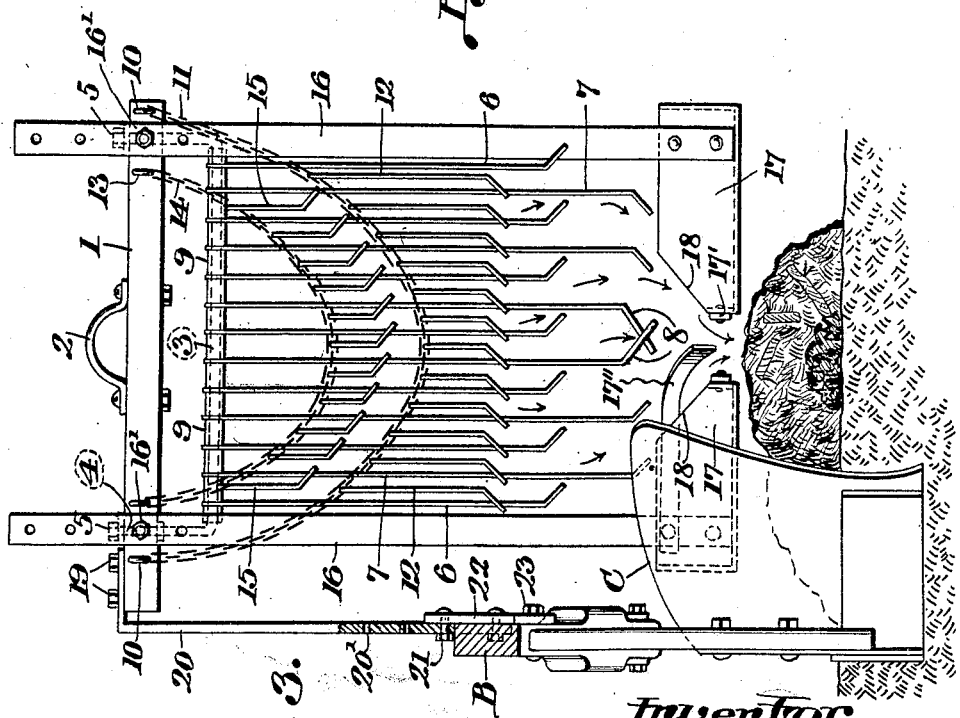
Inventor
Homer Vining
by his Attorneys Patented May 13, 1924.

1,493,830

UNITED STATES PATENT OFFICE.

HOMER VINING, OF HAWKINSVILLE, GEORGIA.

BOLL-WEEVIL RAKE OR COMB.

Application filed April 16, 1923. Serial No. 632,391.

*To all whom it may concern:*

Be it known that I, HOMER VINING, a citizen of the United States, and resident of Hawkinsville, in the county of Pulaski and State of Georgia, have invented certain new and useful Improvements in Boll-Weevil Rakes or Combs, of which the following is a specification.

My invention relates to new and useful devices for brushing or shaking boll weevils and dead squares from the cotton stalks, and depositing them in such position that they may be covered by the earth turned over by a suitable plow.

An object of the invention is to provide a device which may be attached to any suitable plow or cultivator without any modification of the latter.

Another object is to provide a simple and efficient device for the purpose which can be readily transported by hand and used as desired.

Another object of the invention is to produce a very efficient arrangement for brushing off the boll weevils which can be readily constructed and repaired.

Other objects will be apparent from the following detailed description and the appended claims.

In the drawings:

Figure 3 is a view taken on the line 3—3 of Figure 2, showing the device in elevation and the plow beam in section.

Figure 4 is a perspective view of a portion of the device on an enlarged scale.

Figure 1:
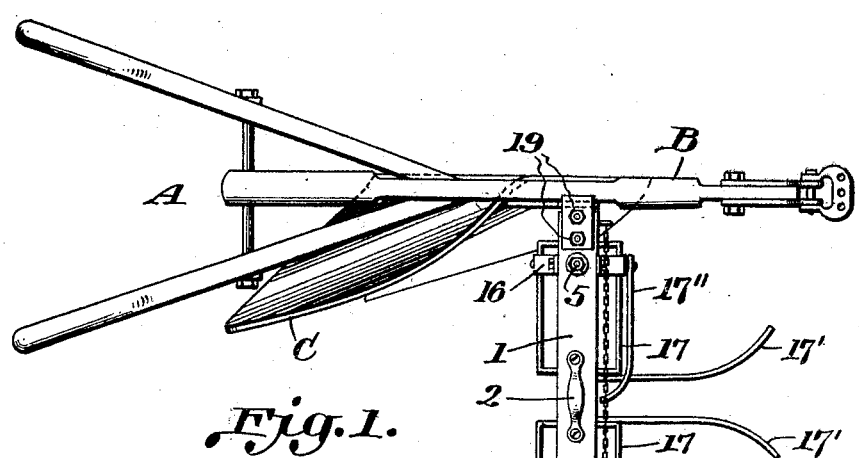
Figure 1 is a top plan view of the device attached to one common form of plow.
Figure 2:
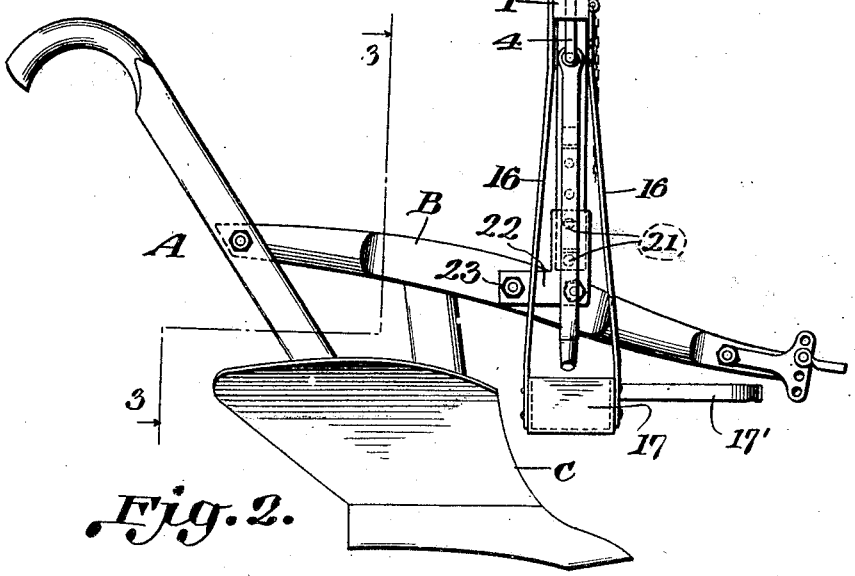
Figure 2 is a side elevation of the same.

The drawings show a common type of plow A having a beam B and share C, this being merely illustrative however, since the particular type of plow or cultivator forms no part of the invention. A beam 1, preferably of wood is provided with a handle 2 for carrying the device. A rod 3 has upturned ends 4 which pass through the beam and are secured by nuts 5 on the ends thereof. Suspended from this rod 3 are a series of metal rods or fingers 6 having their lower ends slightly offset in one direction and an alternating series of longer metal rods 7 having their lower ends similarly offset in the opposite direction. These rods swing freely on the rod 3 and are kept spaced by collars 9 thereon. The two center longer rods 7 may have overlapping ends 8 as indicated in Figure 3.

Fastened at its ends to eyes 10 near the ends of the beam 1 is a chain 11 which hangs freely as indicated. Carried from this chain in any suitable manner is a series of rods or fingers 12 of varying lengths so that their ends lie at about the same level. The lower ends of the rods of this series are offset to one side. Fastened at its ends to eyes 13 which are located inwardly of the beam from the eyes 10 is a chain 14 which hangs freely. Attached thereto in any suitable manner is another series of rods or fingers 15 which are all of the same length and whose ends therefore lie in a curve similar to that of the chain 14. The lower ends of these rods are offset oppositely to those of the strips 12.

It is obvious that all of these members, the chains 11, 14 and the rods 6, 7, 12 and 15, hang freely and may swing readily to and fro. The rods 6 and 7 can only swing in a fore and aft direction, while the chains may swing with their strips sidewise as well, and these rods have an almost universal movement upon the chains.

Supported by each end of the beam or bar 1 are metal strips 16 which are fastened to the bar by bolts 16'. These strips are provided with a plurality of holes in order that their position may be adjusted. The lower ends of the strips 16 support pans 17 which are fastened thereto by bolts, rivets or in any other suitable manner. These pans are rectangular with open tops and have their inner ends beveled off as shown at 18 in Figure 3. These may be adapted to contain some liquid which will kill the weevils, or the contents may be plowed under from time to time or otherwise disposed of.

Attached to the pans 17 or other suitable support are strips 17' which extend forwardly and are outwardly bowed. These are adapted to bend the plants inwardly and cause them to pass between the pans. Attached to one pan 17 is a strip 17" as best shown in Figure 3 which bends the young plants so that the weevil and punctured squares will fall into the pans.

The device thus far described is adapted to be attached to the plow beam B or to any desired form of cultivator which may pass between the rows of cotton. The attachment will come over the cotton plants and the chains and strips will knock off the boll weevils and injured or dead squares into the pans. The rods and chains are freely swinging and will therefore not damage the healthy plants in their passage over the same. The various rods and fingers may be made of the form shown or they may be made in any desired form which will prevent any damage to the plants. The device therefore forms a simple, rapid and expeditious means for accomplishing the desired result. It is not heavy and can be transported from place to place by the handle 2.

The attachment may be fastened to the plow or cultivator in any desired or suitable manner. I have illustrated one form of attachment for the type of plow herein shown in the drawings.

Fastened by bolts 19 to the bar 1 is a downwardly extending arm 20 provided with openings 20′ through which fastenings 21 may pass. The plurality of openings permits adjustment as desired. These bolts 21 pass through a right angle metal piece 22 which is attached to the plow beam by bolts 23. Other equivalent forms of support may be provided, since the invention does not reside in any specific means of supporting the device from the carrying implement.

It is obvious that many detail changes in the precise form and arrangement of the parts or the materials employed may be made without departing from the spirit of the invention, and in general it is to be understood that the invention is limited only by the scope of the appended claims.

I claim as my invention:

1. A boll weevil comb comprising a supporting member, a rod carried thereby, fingers having offset ends freely depending from said rod, chains supported at their ends by said member, and other depending fingers carried by said chains.

2. A boll weevil comb comprising a supporting member, a series of fingers of alternating lengths and having offset ends carried by said member and loosely depending therefrom, pans carried by said member and underlying all but the central fingers, and means for attaching said member to a plow or similar implement.

3. A boll weevil comb comprising a supporting member, a rod carried thereby, chains supported at their ends near the end of said member and hanging in loops, depending fingers freely supported by the rod and each of the chains, the various fingers varying in length and having offset ends, and means for attaching the member to a plow or similar implement.

4. A boll weevil comb comprising a supporting member, a rod carried thereby, chains supported at their ends near the end of the member and hanging in loops, depending fingers of varying lengths and having offset ends carried by the rod and each of the chains, pans carried by said member and underlying the fingers, and means for supporting the member on a plow or similar implement.

In testimony whereof, I have hereunto subscribed my name.

HOMER VINING.